US011654629B2

(12) United States Patent
Moreno Cleves et al.

(10) Patent No.: US 11,654,629 B2
(45) Date of Patent: May 23, 2023

(54) MIRROR ASSEMBLIES FOR THREE DIMENSIONAL PRINTERS

(71) Applicant: Hewlett-Packard Development Company, L.P., Spring, TX (US)

(72) Inventors: Camilo Andres Moreno Cleves, Palo Alto, CA (US); Krzysztof Nauka, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 33 days.

(21) Appl. No.: 17/257,342

(22) PCT Filed: Oct. 26, 2018

(86) PCT No.: PCT/US2018/057677
§ 371 (c)(1),
(2) Date: Dec. 31, 2020

(87) PCT Pub. No.: WO2020/086091
PCT Pub. Date: Apr. 30, 2020

(65) Prior Publication Data
US 2021/0268737 A1     Sep. 2, 2021

(51) Int. Cl.
*B29C 64/153*     (2017.01)
*B29C 64/264*     (2017.01)
(Continued)

(52) U.S. Cl.
CPC .......... *B29C 64/291* (2017.08); *B29C 64/153* (2017.08); *B33Y 10/00* (2014.12);
(Continued)

(58) Field of Classification Search
CPC .......... B22F 10/28; B22F 10/36; B22F 12/44; B29C 64/153; B29C 64/264; B33Y 30/00;
(Continued)

(56) References Cited

U.S. PATENT DOCUMENTS

| | | | | |
|---|---|---|---|---|
| 4,990,788 A | * | 2/1991 | Rabl | ........................ F21V 7/04 250/503.1 |
| 5,692,287 A | * | 12/1997 | Nakamura | ............... G02B 5/09 359/850 |

(Continued)

FOREIGN PATENT DOCUMENTS

| | | |
|---|---|---|
| CN | 203766034 U | 8/2004 |
| CN | 107718552 A | 2/2018 |

(Continued)

*Primary Examiner* — Alexander M Weddle
(74) *Attorney, Agent, or Firm* — Shook, Hardy & Bacon L.L.P.

(57) ABSTRACT

In example implementations, a minor assembly for a three dimensional printer is provided. The minor assembly includes a first side and a second side. The first side is symmetrical to the second side and enclose a cylindrical light source. The first side and the second side each include a first curved reflective surface and a second curved reflective surface. An end of the first curved reflective surface and a beginning of the second curved reflective surface form an edge along a surface formed by the first curved reflective surface and the second curved reflective surface.

9 Claims, 8 Drawing Sheets

(51) Int. Cl.
  *B33Y 30/00* (2015.01)
  *G02B 5/10* (2006.01)
  *B29C 64/291* (2017.01)
  *B33Y 10/00* (2015.01)
  *B33Y 50/02* (2015.01)

(52) U.S. Cl.
  CPC ............... *B33Y 30/00* (2014.12); *G02B 5/10* (2013.01); *B33Y 50/02* (2014.12)

(58) Field of Classification Search
  CPC .... B33Y 10/00; B33Y 50/02; G02B 19/0023; G02B 5/10
  See application file for complete search history.

(56) References Cited

U.S. PATENT DOCUMENTS

| | | |
|---|---|---|
| 7,934,802 B2 | 5/2011 | Nakata et al. |
| 7,963,647 B2 | 6/2011 | Nakata et al. |
| 2004/0145820 A1 * | 7/2004 | Harwit ................ G02B 5/09 359/811 |
| 2008/0094460 A1 | 4/2008 | Nakata et al. |
| 2009/0046135 A1 | 2/2009 | Namai et al. |
| 2009/0073232 A1 | 3/2009 | Nakata et al. |
| 2014/0338591 A1 * | 11/2014 | Ikeda ............... H01L 21/67115 117/220 |
| 2015/0160453 A1 * | 6/2015 | Yang ................ G02B 26/101 359/201.2 |

FOREIGN PATENT DOCUMENTS

| | | | | |
|---|---|---|---|---|
| CN | 108146065 A | * | 6/2018 | ............ B41M 1/22 |
| GB | 2550338 A | * | 11/2017 | ......... B29C 35/0805 |
| KR | 20100138744 A | | 12/2010 | |
| RU | 2047191 | | 10/1995 | |
| RU | 90529 | | 1/2010 | |
| WO | WO-2007105149 | | 9/2007 | |
| WO | WO-2007105149 A1 | * | 9/2007 | ......... G02B 19/0023 |
| WO | WO-2017197015 | | 11/2017 | |
| WO | WO-2017197015 A1 | * | 11/2017 | ......... B29C 35/0805 |

* cited by examiner

MIRROR ASSEMBLIES FOR THREE DIMENSIONAL PRINTERS

BACKGROUND

Some printers are used to build three dimensional objects. For example, 3D printers may use powder bed fusion-type 3D printing, binder-type 3D printing, use a printing agent to promote material fusion when irradiated, use an agent to suppress fusion in areas that are not to be printed, and the like. In the various types of 3D printers described above, an energy source may be applied to portions of the build material to print the 3D object.

DETAILED DESCRIPTION

Examples described herein provide a mirror assembly for a three dimensional (3D) printer. As noted above, 3D printers are used to build 3D objects. The different types of 3D printing process may include a powder bed fusion-type 3D printing process, a binder-type 3D printing process, using a printing agent to promote material fusion when irradiated, using an agent suppressing fusion in areas that are not to be printed, and the like. In certain 3D printing processes, defects may be caused in layers of the 3D object that is printed if the energy source is not evenly applied to the entire bed of the build material.

In one example, the energy source may be a light source. The present disclosure provides a mirror assembly design that allows the light source to provide a uniform illumination of the entire bed of build material or powder. Said another way, the mirror assembly may allow the same amount of energy to be applied to all areas of the bed of build material during an illumination process.

Figure 1:
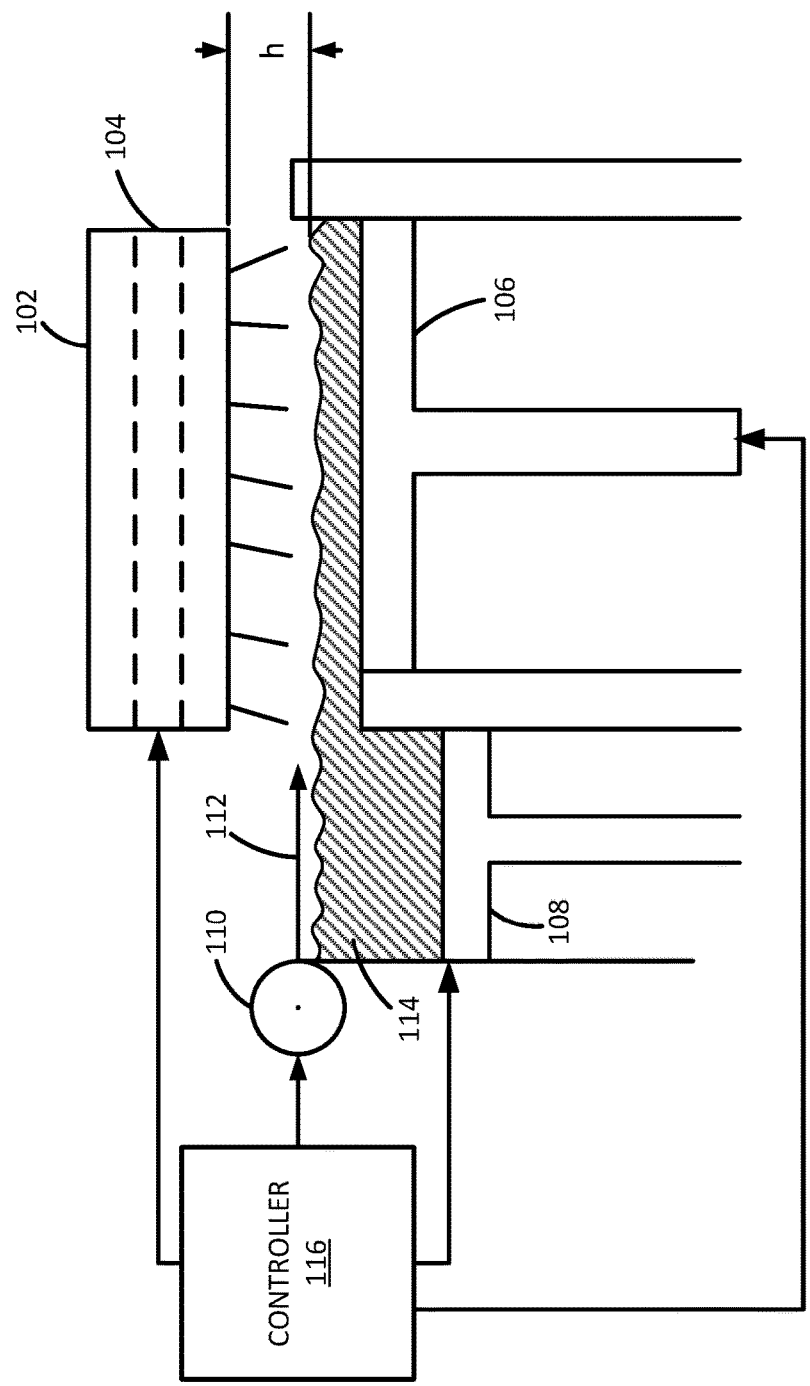
FIG. 1 is a block diagram of an example 3D printer with a mirror assembly of the present disclosure.

FIG. 1 illustrates an example three dimensional (3D) printer 100 having a mirror assembly 102 of the present disclosure. The example illustrated in FIG. 1 may use a powder bed fusion-type 3D printing process. However, it should be noted that the mirror assembly 102 may be deployed in any type of 3D printer or printing process that desires a uniform illumination on a target area. In addition, the 3D printer 100 has been simplified for ease of explanation and may include additional components that are not shown. For example, the 3D printer may include printheads, a binding material container, a housing, and the like.

In one example, the 3D printer may include a mirror assembly 102 having a light source 104 located above a platform 106 containing a build material 114. A build material dispenser 108 may dispense the build material 114 onto the platform 106. A spreader 110 may be moved in a direction shown by an arrow 112 to level the build material 114 on the platform 106. The spreader 110 may be a blade, a roller, or any other type of mechanism that may evenly spread the build material 114 across the platform 106. The build material 114 may be any type of plastic or metal in a loose powder form that can be used for additive printing.

In one example, the light source 104, the platform 106, the build material dispenser 108, and the spreader 110 may be communicatively coupled to a controller 116. The controller 116 may be a processor executing instructions stored in memory to control operation of the light source 104, the platform 106, the build material dispenser 108, and the spreader 110.

In one example, a printhead (not shown) may be controlled by the controller 116 to print a desired pattern in a layer of the platform 106. The light source 104 may be used to activate a binding material to bind portions of the build material 114 that are "printed". The platform 106 may be lowered and another layer of the build material 114 may be dispensed by the build material dispenser 108. The process may then be repeated to print another layer of the 3D object until the 3D object is completed.

In one example, the light source 104 may be a cylindrical xenon discharge tube. The xenon flash tube may be a pulse xenon lamp that provides a high enough irradiation energy to melt/fuse metal and some high melting temperature plastic powders. The cylindrical shape may be used as the cylindrical shape allows a high enough energy discharge to be achieved.

The mirror assembly 102 of the present disclosure may enclose the light source 104 such that the light emitted by the light source 104 provides uniform illumination on the build material 114 on the platform 106. In one example, the uniform illumination may be on a target area of the platform 106. The target area may have a rectangular shape.

In one example, "uniform" may be defined to be having an illumination on each point of the target area within a pre-defined threshold of an average of the overall illumination. For example, the pre-defined threshold may be +/−3% of the average illumination within the target area.

In addition, the mirror assembly 102 may be designed to provide a relatively large drop off in illumination outside of the target area. For example, moving a small distance from an edge of the target area (e.g., within a distance less than 5% of a width or a length of the target area) the irradiance or illumination may fall to below 10% of the amount of illumination on the target area.

In other words, the mirror assembly 102 may be designed to focus as much of the light emitted by the light source 104 on the target area. Conversely, the mirror assembly 102 may be designed to minimize the amount of light emitted by the light source 104 that falls outside of the target area.

In one example, the mirror assembly 102 may be designed to provide uniform illumination at a height "h" above the top surface of the build material 114 on the platform 106. The height "h" may be chosen based on a desired 3D printing apparatus or process. For example, if the 3D printer is a powder bed fusion-type 3D printer as illustrated in FIG. 1, then the height "h" may be a function of a size of the spreader 110. For example, the height "h" may provide enough clearance for the spreader 110 to move below the mirror assembly 102 and the light source 104 as the spreader 110 levels the layer of the build material 114 on the platform 106. Although one example of the height "h" is illustrated in one type of 3D printer, it should be noted that the height "h" may be a function of the type of 3D printer that is deployed and the mechanisms or components that may travel below the mirror assembly 102 and the light source 104.

In one example, the height "h" of a particular 3D printer, a diameter of the light source 104, and a desired target area may be selected parameters. These parameters may provide values to various functions described below that may define curved surfaces of the mirror assembly 102. In other words, for a chosen set of parameters of a particular 3D printing apparatus, a corresponding mirror assembly 102 may be designed to provide uniform illumination on the selected target area, as discussed in further details below.

Figure 2:
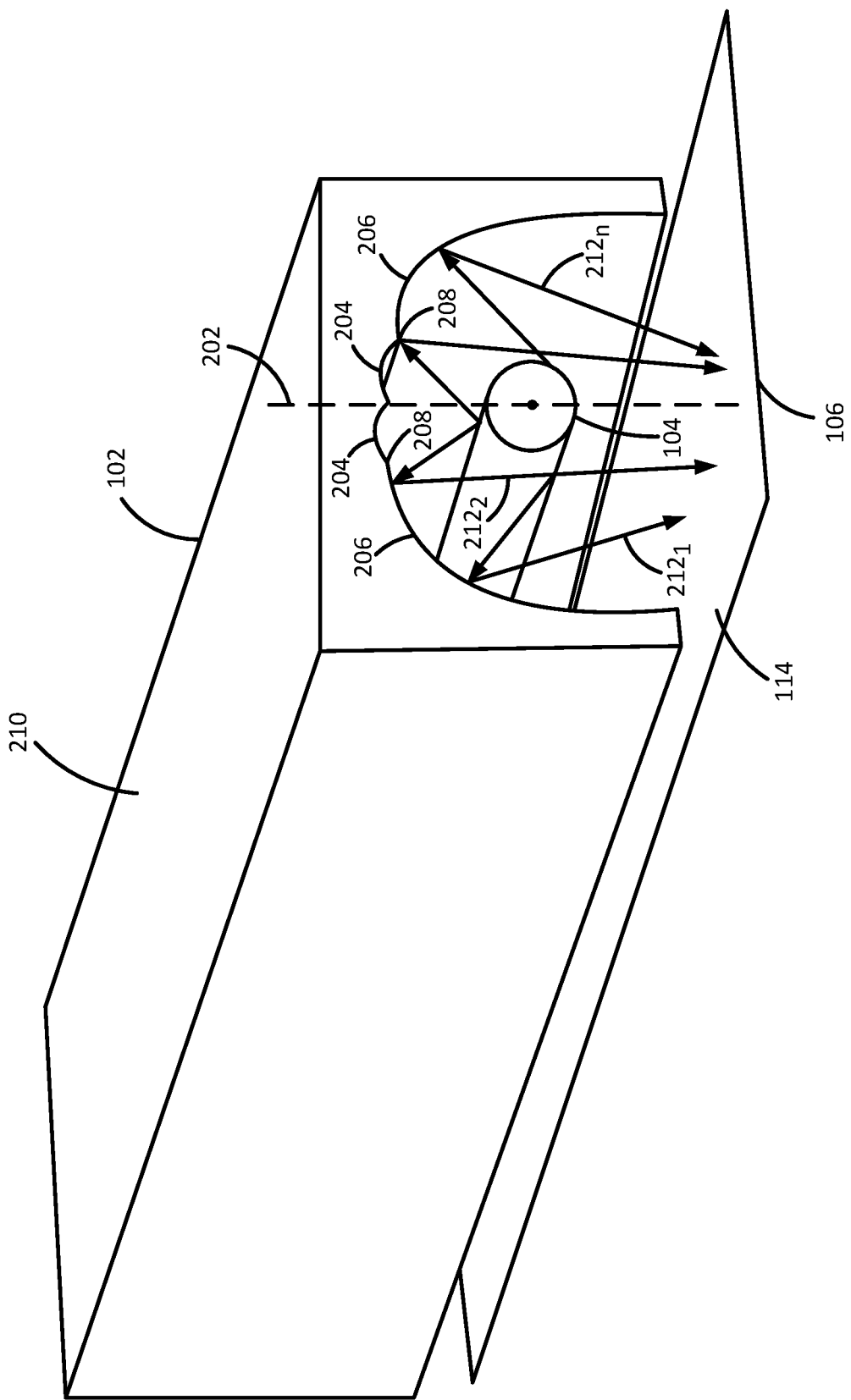
FIG. 2 is an isometric view of the mirror assembly of the present disclosure.

FIG. 2 illustrates an isometric view of the mirror assembly 102 and the light source 104. In one example, the mirror assembly 102 may include a plane of symmetry 202. Each side of the mirror assembly 102 opposite the plane of symmetry 202 may be identical.

In one example, each side of the mirror assembly 102 may include a first curved reflective surface 204 and a second curved reflective surface 206. An end of the first curved reflective surface 204 furthest away from the plane of symmetry 202 and a beginning of the second curved reflective surface 206 closest to the plane of symmetry 202 may form an edge 208 along a length of the mirror assembly 102.

Said another way, the first curved reflective surface 204 and the second curved reflective surface 206 may be different curves that are connected to form a continuous surface on each side of the mirror assembly 102. The first curved reflective surface 204 and the second curved reflective surface 206 may be formed according to two different polynomial curves, as described and discussed below. In other words, the first curved reflective surface 204 and the second curved reflective surface 206 intersect at a visible point to form the edge 208 on each side of the mirror assembly 102.

The first curved reflective surface 204 and the second curved reflective surface 206 may work together to provide a uniform illumination on a target area of the build material 114 located below the light source 104. For example, the first curved reflective surface 204 may "transform" the tubular light source (e.g., the light source 104) into a virtual flat source (e.g., the source does not actually exist, but light rays may be behave as they were emitted from a flat source). The second curved reflective surface 206 may reflect the light emitted from a virtual flat source of the light source 104 across the target plane. Thus, the first curved reflective surface 204 and the second curved reflective surface 206 may work together to reflect light rays $212_1$ to $212_n$ (hereinafter also referred to individually as a light ray 212 or collectively as light rays 212) emitted by the light source 104 to uniformly illuminate the target area of the build material 114 on the platform 106.

As noted above, the target area, or plane, may be chosen for a particular application. The chosen target area may be used to determine the design of the first curved reflective surface 204 and the second curved reflective surface 206. For example, the chosen target area may determine a truncation point of the first curved reflective surface 204, as described below and illustrated in FIG. 4.

In one example, the first curved reflective surface 204 and the second curved reflective surface 206 of the mirror assembly 102 may be carved out of a metal block 210 by a computer numerical control (CNC) machine. The CNC machine may carve or cut the mirror assembly 102 in accordance with functions described below. Fabrication of the mirror assembly 102 may also be done by high degree of freedom methods, such as diamond turning or diamond milling on a dielectric material.

The surface may be finished to a particular quality to provide sufficient reflection of the light emitted from the light source 104. For example, the quality may be determined by a selected standard (e.g., U.S. Standard MIL-PRF-13830B). Subsequent polishing of the surface may provide low surface roughness. Posterior metal coating or sputtering on the finished surface may be used to make the surface reflective.

In one example, the metal block 210 may be any type of metal or metal alloy that can provide a reflective surface. The metal block 210 may also be a metal that has a high thermal conductivity to act as a heat sink and provide a high amount of heat transfer generated by the light source 104. In one example, the metal block 210 may be aluminum or gold. In another example, the metal block 210 may be any type of metal and a reflective surface may be applied to the metal. For example, a reflective surface or coating may be applied to the surface of the first curved reflective surface 204 and the second curved reflective surface 206 after being carved from the metal block 210.

In one example, the tubes, openings, tunnels, and the like (not shown), may be cut out of metal block 210 along a length of a dielectric or the metal block 210 and above the first curved reflective surface 204 and the second curved reflective surface 206. The tubes may provide path ways for a cooling fluid to flow through the metal block 210 to provide further heat transfer. The location of the tubes may be elected to uniformly remove heat that may originate from the part of the impinging radiation that is not reflected, but absorbed by surfaces of the mirror assembly 102.

In one example, a longitudinal axis of the light source 104 (e.g., a line that runs through a center of the light source 104 along the length of the light source 104) may be located on the plane of symmetry 202. The longitudinal axis may be perpendicular to a plane of the cross-section of the mirror assembly 102 shown in FIG. 3. In addition, the edges 208 formed by the boundaries between the first curved reflective surface 204 and the second curved reflective surface 206 may be parallel to the longitudinal axis of the light source 104. As noted above, a location of the light source 104 in a vertical direction along the plane of symmetry 202 and a diameter of the light source 104 that is chosen may determine solutions to a number of functions described below that define the first curved reflective surface 204 and the second curved reflective surface 206.

Figure 3:
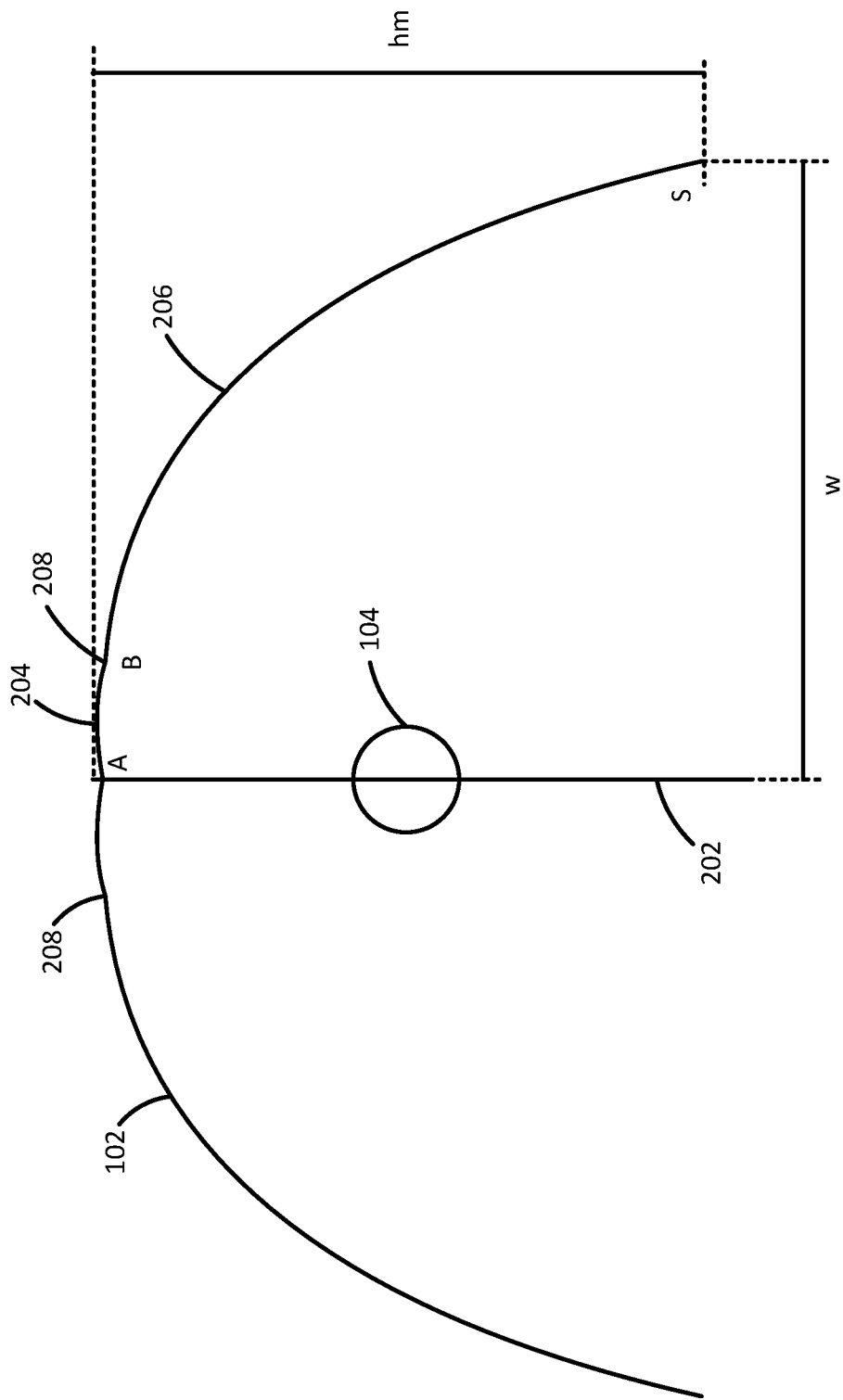
FIG. 3 is a cross-sectional view of the mirror assembly and a light source of the present disclosure.

FIG. 3 illustrates a front cross-sectional view of the mirror assembly 102. The mirror assembly 102 may have a height "$h_m$" and a width "w" as shown by FIG. 3. In one example, the height "$h_m$" and the width "w" of the mirror assembly 102 may be between 8 to 10 times a radius of the light source 104.

In one example, the first curved reflective surface 204 may be defined by a section AB. Point A may be a center of the mirror assembly 102 where the plane of symmetry 202 runs through the center of the mirror assembly 102 and the light source 104. Point B may be a point where the first curved reflective surface 204 and the second curved reflective surface 206 intersect. In other words, point B may be the point where the edge 208 is formed in the mirror assembly 102.

In one example, the first curved reflective surface 204 may be a concave curve. The first curved reflective surface 204 may be a truncated circle involute. An involute may be created by a curve formed by tracing one end of line segments having opposite ends that are tangent to a curve (e.g., a curve of the cylindrical light source 104). The length of each line segment may be changed by an amount equal to an arc length traversed by a tangent point as the line segments move along the curve. For example, each point of the first curved reflective surface 204 may be perpendicular to a respective tangent light ray emitted from the light source 104.

Figure 4:
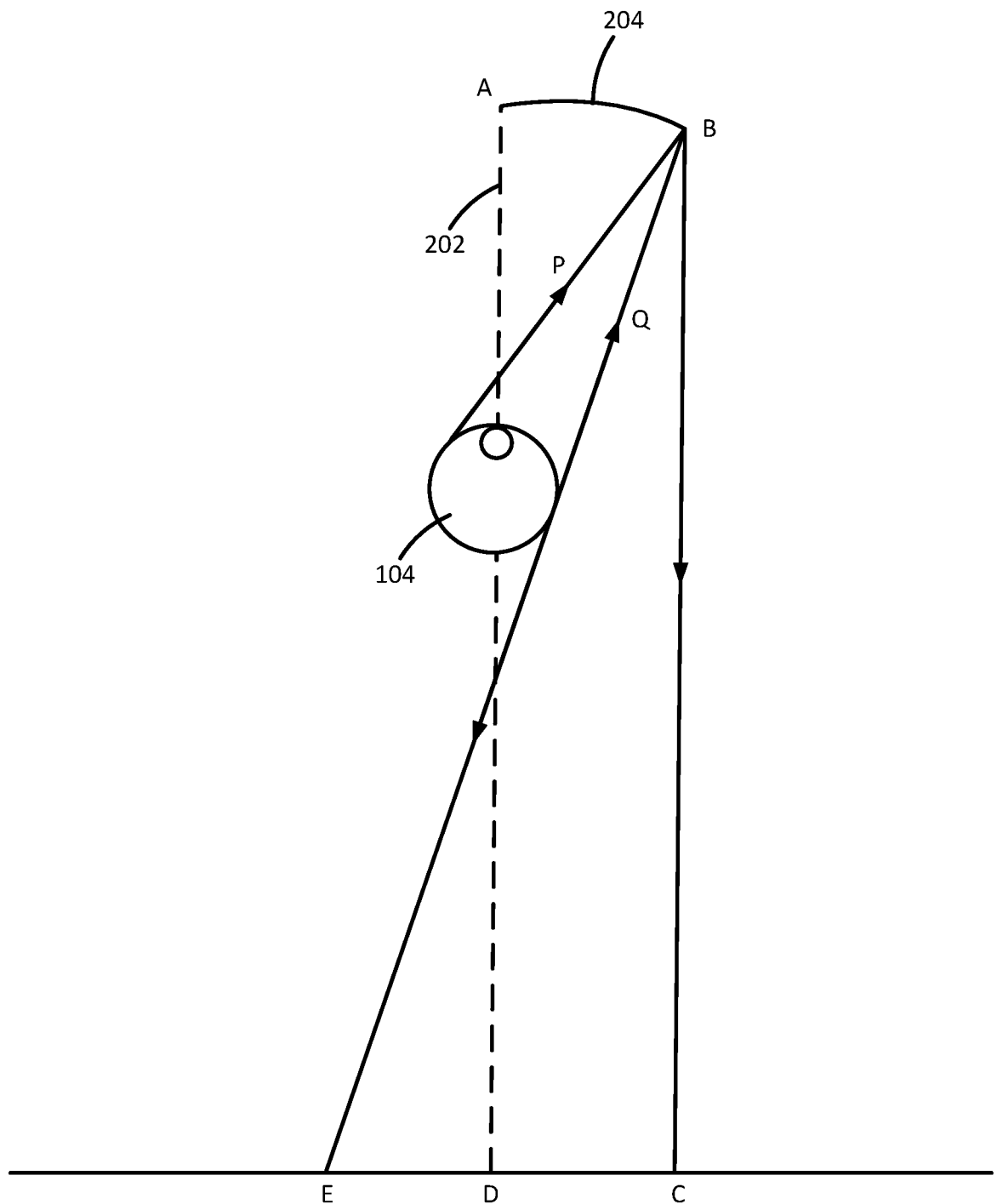
FIG. 4 is a cross-sectional view of a first curved reflective surface of the mirror assembly and a target plane of reflected light rays of the first curved reflective surface of the present disclosure.

FIG. 4 illustrates a cross-sectional view of the first curved reflective surface 204 and a target plane EC. As noted above, the mirror assembly 102 includes two symmetrical sides. Thus, the description of the first curved reflective surface 204 may be identical on the opposite side of the plane of symmetry 202.

FIG. 4 illustrates one example, of how a plane EDC of a chosen target plane may define a truncation point B of the first curved reflective surface 204. The plane EDC may be the same as the chosen target plane or may be within the chosen target plane.

In one example, the shape of the first curved reflective surface 204 may be known using the functions described below. A point D in the platform 106 may be directly below the light source 104. Tangent light rays may be emitted to any point along the first curved reflective surface 204. The first curved reflective surface 204 may be truncated at a point B at a point where a tangential light ray P and reflected light rays Q reach the platform 106 such that a segment ED and a segment DC are equal. As the as the height of the light source 104 with respect to the platform 106 is changed, the truncation point B may also change for the first curved reflective surface 204.

In one example, the shape of the circle involute of the first curved reflective surface 204 may be defined by the relationship given by the functions (1) and (2) below:

$$x = t(\cos \psi + \psi \sin \psi), \quad (1)$$

$$y = t(\sin \psi + \psi \cos \psi) \quad (2)$$

where t is a radius of the light source 104, $\psi$ is an involute parameter defined by a distance AO, and x and y are coordinates of each point of the first curved reflective surface 204 in an x-y coordinate plane where a center of the light source 104 is (0,0) in the x-y plane.

In one example, the involute parameter is varied, the values of x and y may be calculated to generate coordinates of each point along the first curved reflective surface 204 for a given radius t of the light source 104. As discussed in further details below, a polynomial may be fit to the values of x and y that are calculated. The polynomial may be provided to a CNC machine that may then carve the first curved reflective surface 204 out of the block of metal 210 or a dielectric material given the polynomial associated with the first curved reflective surface 204.

In one example, the point A may be truncated at a point where the shortest mirror-lamp distance (e.g., the line from A to O) matches a separation given by a particular design. The point B may be truncated at a point in which the reflection of a cross-section of the light source 104 is centered at the target plane EDC. This may mean that the light rays P and Q emitted from the two edges of the light source 104 towards the truncation point may be reflected in a direction towards the target plane EDC such that the points C and E where the rays fall on the target plane EDC are equally spaced with respect to the point D along the plane of symmetry 202.

Referring back to FIG. 3, the second curved reflective surface 206 may be defined by a section BS. The second curved reflective surface 206 may also be a concave curve. The concave curve may be defined by a set of functions that can be solved to provide x-y coordinates along each point of the second curved reflective surface 206. The x-y coordinates may then be fit to at least one polynomial. In one example, the second curved reflective surface 206 may be defined by two polynomials. The polynomials may be at least a fourth order polynomial or higher that determine adjacent segments of the second curved reflective surface 204.

Figure 5:
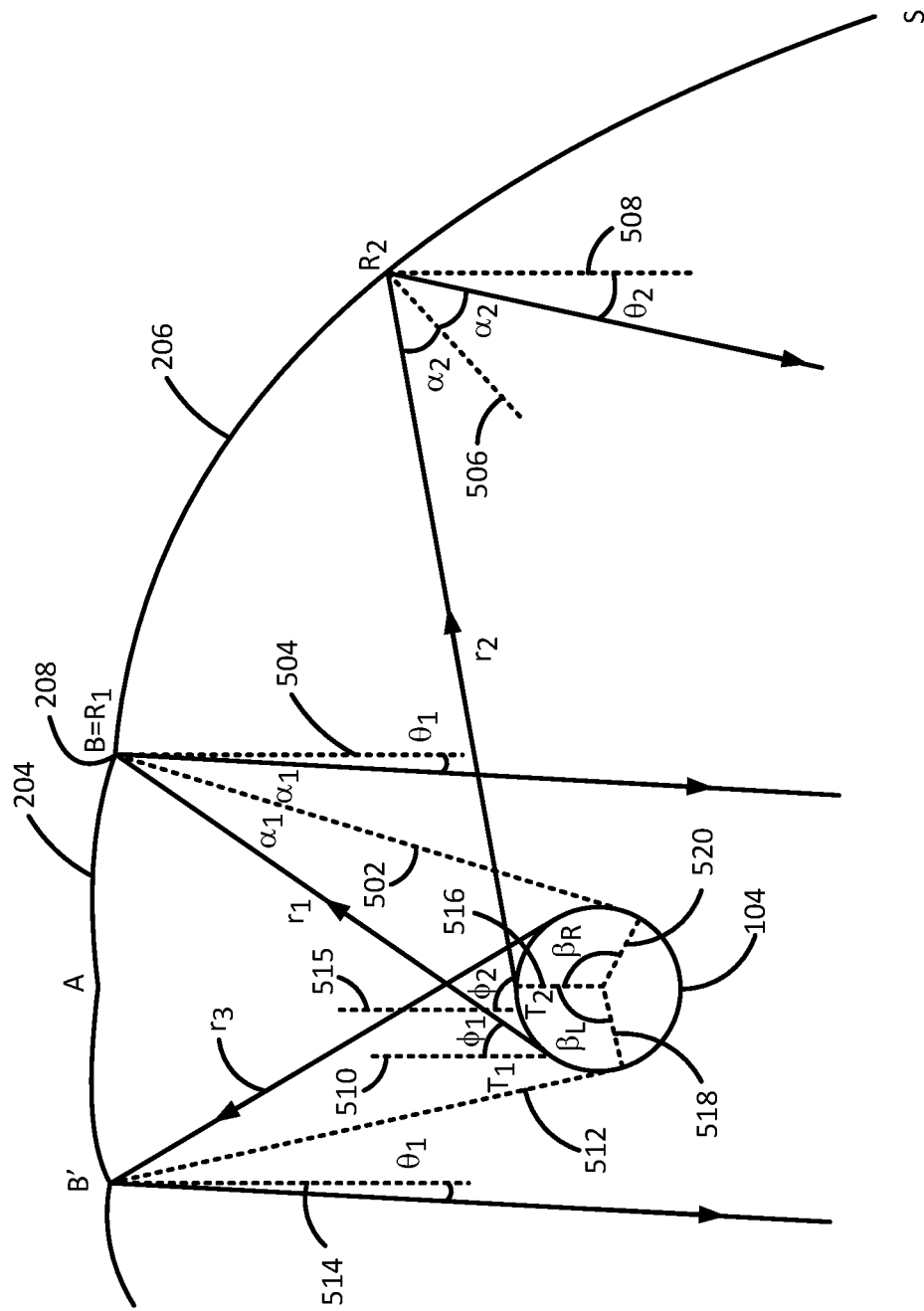
FIG. 5 is a cross-sectional view of a second curved reflective surface of the mirror assembly and various parameters used to calculate the second curved reflective surface of the present disclosure.

In one example, the x-y coordinates of each point along the second curved reflective surface 206 may be obtained by solving various functions given a parameter r for a given polar coordinate. The functions that are used are shown below as functions (3)-(5):

$$C_m = P(\theta) + 2t\theta - \cot \alpha \ p(\theta) + 2t \ \tan^{-1}(\cot \alpha), \quad (3)$$

$$p(\theta) = -2t - 2t[\sin(\beta_R - \theta) + \sin(\beta_L + \theta)] + r_1 + t \ \tan\left(\frac{\varphi_1}{2}\right) + \frac{k}{(\cos\theta)^2}, \quad (4)$$

$$p(\theta) = (r + t \ \tan \alpha)\sin(2\alpha), \quad (5)$$

where $C_m$ is a constant, t is the radius of the light source 104, $p(\theta)$ is given by function (4), $\beta_R$ and $\beta_L$ are shown in FIG. 5, k is a constant, $\theta$ is an angle as shown in FIG. 5, $P(\theta)$ is an indefinite integral of $p(\theta)$, and $\alpha$ can be solved for $\theta$ from function (3) and is related with r by function (5).

FIG. 5 illustrates the relationship of the parameters of functions (3)-(5), as noted above. In one example, the angle $\alpha$ may be defined by a light ray that emitted from the light source 104 and tangent to the light source 104 and a line that is normal to a point that the light ray contacts the second curved reflective surface 206. Examples of $\alpha$ are illustrated in FIG. 5 as the angle $\alpha_1$ between light ray $r_1$ and a line 502 that is normal to a point B where the light ray $r_1$ is reflected or the angle $\alpha_2$ between the light ray $r_2$ and a line 506 that is normal to the point $R_2$ where the light ray $r_2$ is reflected.

The angle $\theta$ may be defied as the angle between the reflected light ray and a vertical line that goes through the point where the light ray is reflected. For example, $\theta_1$ may be the angle between a line 504 that is vertical to the point B that reflects the light ray $r_1$. The angle $\theta_2$ may be the angle between a line 508 that is vertical to the point $R_2$ that reflects the light ray $r_2$, and so forth.

As noted above, the second curved reflective surface 206 may be symmetrical around the plane of symmetry 202. Thus, the opposite side of the mirror assembly 102 may also have the same angles $\alpha_1$, $\alpha_2$, $\theta_1$, $\theta_2$, and so forth. For example, the same angle $\alpha_1$ may be formed between a light ray $r_3$ and a line 512 that is normal to the point B' that reflects the light ray $r_3$. The same angle $\theta_1$ may be formed by a reflected light of a light ray $r_3$ and a line 514 that is vertical to a point B' that reflects the light ray $r_3$.

In one example, the angle $\phi$ may be an angle that is measured between a light ray that is tangent to the light source 104 and a vertical line from the point that the light ray is tangent to the light source 104. For example, $\phi_1$ may be the angle that is measured between the light ray $r_1$ and a line 510 that is vertical to a point $T_1$ where the light ray $r_1$ is tangent to the light source 104. The angle $\phi_2$ may be the angle that is measured between the light ray $r_2$ and a vertical line 515 that is vertical to a point $T_2$ where the light ray $r_2$ is tangent to the light source 104.

In one example, the angles $\beta_R$ and $\beta_L$ may be dependent on one another. As the angle $\beta_L$ grows larger, the angle $\beta_R$ may grow smaller, and vice versa. In one example, the angle $\beta_L$ may be the angle measured between a line 516 that is vertical from a center of the light source 104 to a point that the line 518 from the center of the light source 104. The line 518 may be a line that is drawn to a point on the edge of the light source 104 where the line 512 contacts the edge of the light source 104. The line 512, as noted above, may be normal to the point B' that reflects the light ray $r_3$. The line 512 may also intersect the light ray $r_3$ and the reflected ray of $r_3$.

Similarly, the angle $\beta_R$ may be measured between the line 516 and a line 520. The line 520 may be drawn from the center of the light source 104 to a point on the edge of the light source 104 where the line 502 contacts the edge of the light source 104. The line 502 may intersect the light ray $r_1$ and the reflected ray of $r_1$.

The functions (3)-(5) may not have an exact solution. Therefore, a set of angles θ may be selected to obtain a solution to the set of angles α, and consequently to a set of magnitudes (e.g., a length) of the light rays r. The magnitude of the light rays r may provide an x-y coordinate of where a particular light ray contacts a surface of the second reflective curved surface 206. As different angles θ are used to obtain the set of angles α and the corresponding magnitudes of the light rays r, the set of x-y coordinates for the points along the surface of the second reflective curved surface 206 may be calculated.

In one example, a predetermined range for the angles θ may be used. In addition, a pre-determined increment for the angle θ for the predetermined range of angles θ may be used. In one example, the predetermined range may be between 0 and 45 degrees. In one example, the pre-determined increment may be 32 values of θ. However, it should be noted that any pre-determined increment may be used. The lower the pre-determined increment, the less accurate the shape of the second reflective curved surface 206 may be, but at a lower processing cost. The higher the pre-determined increment, the more accurate the shape of the second reflective curved surface 206 may be, but at a higher processing cost.

Figure 6:
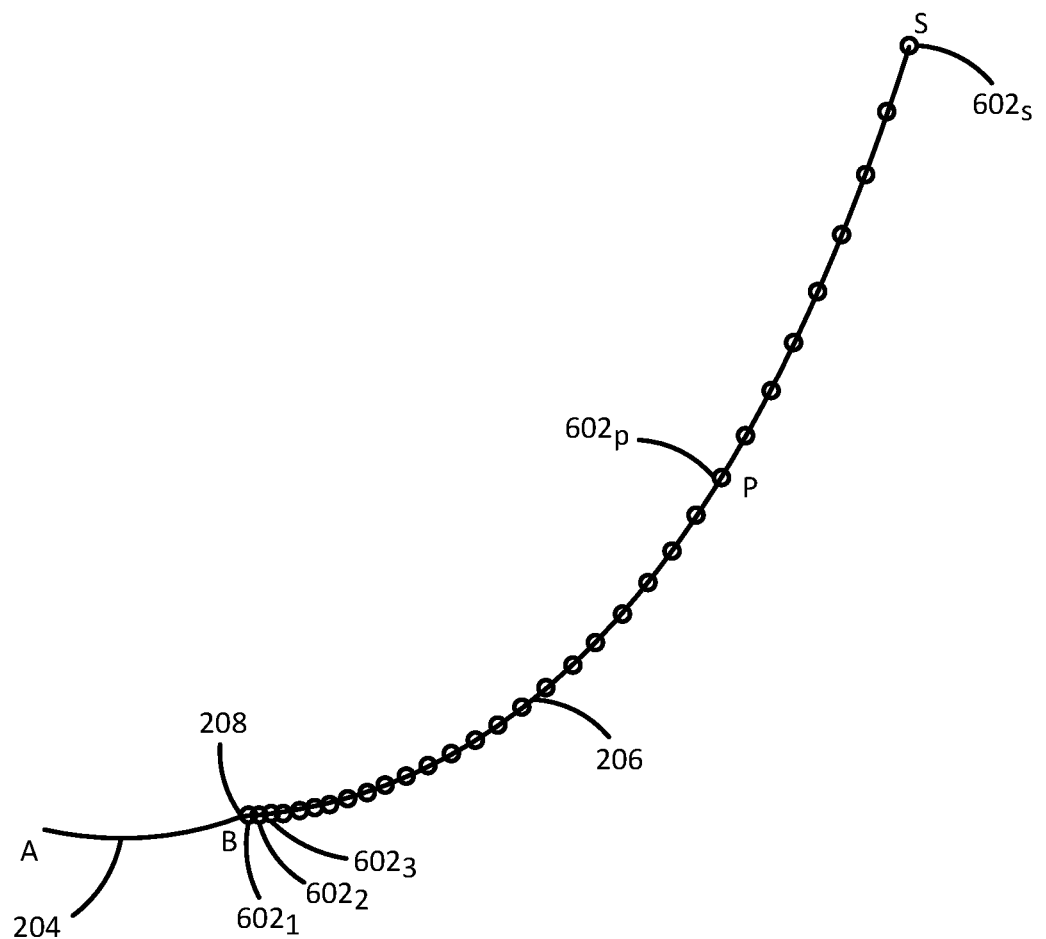
FIG. 6 is diagram of calculated coordinates for points along the first curved reflective surface and second curved reflective surface that are fit to a polynomial that best the coordinates of the present disclosure.

FIG. 6 illustrates an example of a plurality of x-y coordinates $602_1$ to $602_S$ (herein also referred to individually as a coordinate 602 or collectively as coordinates 602) that may be calculated using the functions (3)-(5) described above. In one example, S may be the 32nd x-y coordinate pair if 32 values are used for θ, as noted above. In one example, the coordinates 602 may be fitted to a polynomial. The polynomial may be a fourth order polynomial or higher.

In one example, the second reflective curved surface 206 may be divided into separate adjacent segments BP and PS. In one example, the point P may be a halfway point in the number of coordinates 602 that are calculated from functions (3)-(5). For example, a first polynomial may be fitted to the coordinates $602_1$ to $602_P$ and a second polynomial may be fitted to the coordinates $602_P$ to $602_S$. Thus, if 32 different increments of B were applied to the functions (3)-(5), then a first polynomial may be fitted to the first 16 coordinate values and a second polynomial may be fitted to the second 16 coordinate values.

Although the example above splits the 32 coordinate values evenly, it should be noted that the coordinate pairs may be unevenly split (e.g., a first polynomial may be fitted to the first 10 coordinate values and a second polynomial may be fitted to the second 22 coordinate values). In one example, the coordinate values may be divided into more than two sets of coordinates. For example, the coordinates may be divided into three even, or uneven, sets of coordinates that may be fit to three different polynomials, and so forth.

In one example, the first polynomial and the second polynomial may both be fourth order polynomials or higher. Although the second reflective curved surface 206 is divided into two adjacent polynomials, the two adjacent polynomials may form a continuous smooth surface of the second reflective curved surface 206. In other words, there may be no visible or noticeable point where the curves of the two adjacent polynomials begin or end when the second reflective curved surface 206 is carved from the dielectric or metal block 210.

In one example, the coefficients for the polynomials may be real numbers and have an interval between −1 and 1. The coefficients may decrease in several orders of magnitude in absolute value as the degree of the term in the polynomial increases.

As noted above, the first reflective curved surface 204 from point A to B may also be fitted to a polynomial function. For example, the functions (1)-(2) may be used to calculate x-y coordinates along the first reflective curved surface 204 similar to how the x-y coordinates are calculated for the second reflective curved surface 206. A polynomial may then be fitted to the x-y coordinates of the first reflective curved surface 204.

Referring back to FIG. 2, although FIG. 2 illustrates an isometric view of the mirror assembly 102 having an open end, it should be noted that the mirror assembly 102 may have end caps. In one example, the length of the mirror assembly 102 may be made slightly longer (e.g., a few centimeters) than a length of the light source 104. Then end caps having flat mirrors that have planes that are perpendicular to a center longitudinal axis of the light source 104 may be coupled to the ends of the mirror assembly 102.

In one example, the end caps may be designed to also have a first curved reflective surface and a second curved reflective surface. The first curved reflective surface and the second curved reflective surface may be designed to produce a substantially uniform illumination (e.g., each area within the target plane is illuminated to within a few percent of an average illumination of the entire target plane, as defined above) of a target plane on the build material 114 on the platform 106.

Figure 7:
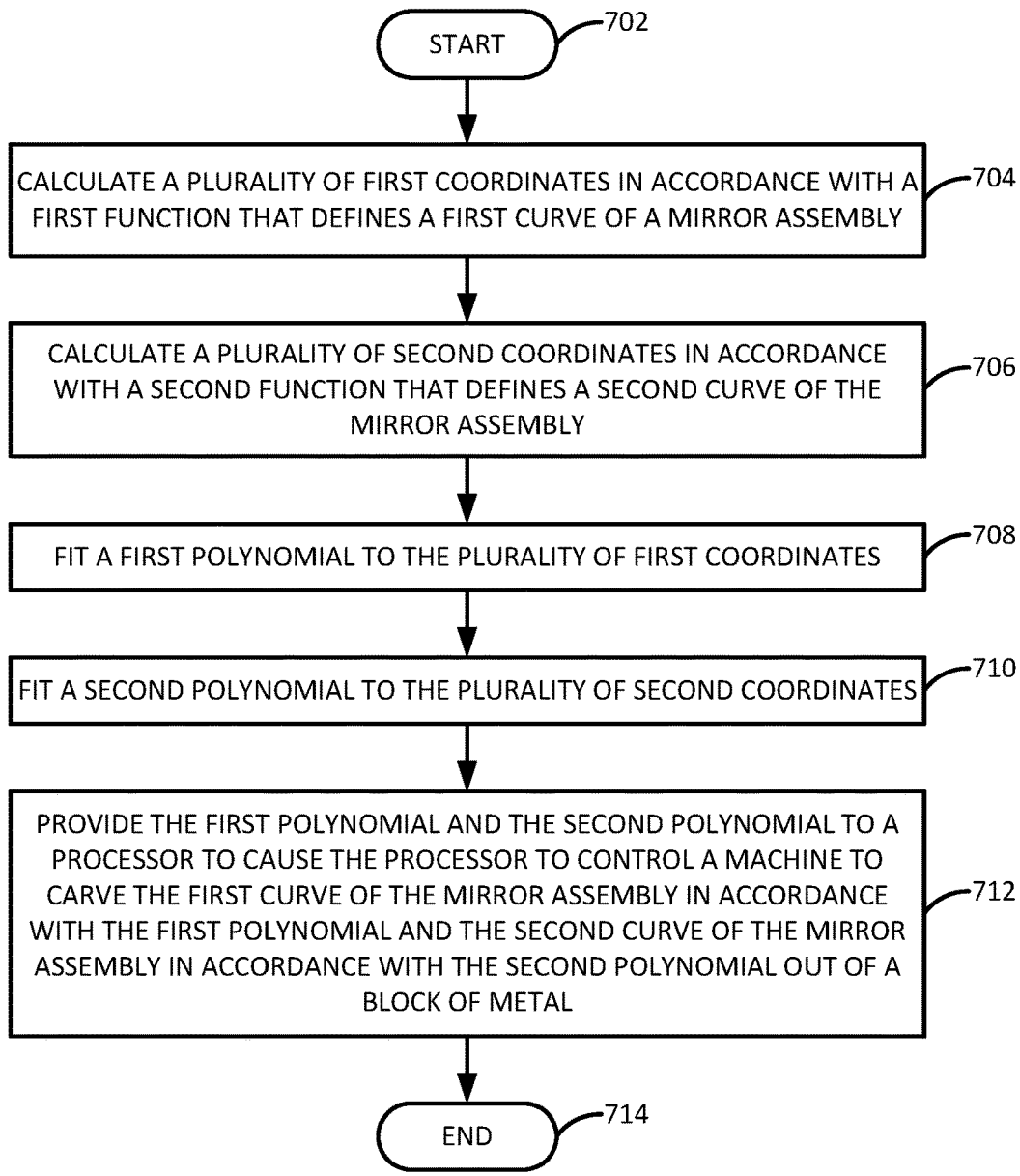
FIG. 7 is a flow chart of an example method for fabricating a mirror assembly for a 3D printer of the present disclosure.

FIG. 7 illustrates a flow diagram of an example method 700 for fabricating the mirror assembly 102 for the 3D printer 100 of the present disclosure. In an example, the method 700 may be performed by a processor executing instructions stored in a non-transitory computer readable medium.

At block 702, the method 700 begins. At block 704, the method 700 calculates a plurality of first coordinates in accordance with a first function that defines a first curved reflective surface of a mirror assembly. In one example, the functions (1) and (2) described above may be used to calculate the first plurality of coordinates.

At block 706, the method 700 calculates a plurality of second coordinates in accordance with a second function that defines a second curved reflective surface of the mirror assembly. In one example, the functions (3), (4), and (5) described above may be used to calculate the plurality of second coordinates. As noted above, the functions (3), (4), and (5) may be solved by applying a predefined number of different angles within a range of angles along the second curved reflective surface.

At block 708, the method 700 fits a first polynomial to the plurality of first coordinates. For example, the first polynomial may define a curve formed by connecting a line through the plurality of first coordinates. In one example, the polynomial may be estimated to be fit within a predefined amount of acceptable error (e.g., less than 0.1% error).

At block 710, the method 700 fits a second polynomial to the plurality of second coordinates. In one example, the second polynomial may be a fourth ordered polynomial or higher. In one example, the plurality of second coordinates may be divided into two adjacent sets of second coordinates. For example, if 32 second coordinates are calculated, the second coordinates may be divided into adjacent sets of 16 coordinates.

In one example, a polynomial may be fitted to each set of coordinates. For example, the second polynomial may be fitted to a first set of the plurality of second coordinates and an additional polynomial (e.g., a third polynomial) may be fitted to a second set of the plurality of second coordinates. Thus, up to three different polynomials may be calculated. For example, a first polynomial that is fitted to the plurality of first coordinates associated with the first curved reflective surface, a second polynomial that is fitted to a first set of the plurality of second coordinates associated with the second curved reflective surface, and a third polynomial that is fitted to a second set of the plurality of second coordinates associated with the second curved reflective surface.

At block 712, the method 700 provides the first polynomial and the second polynomial to a processor to cause the processor to control a machine to carve the first curved reflective surface of the mirror assembly in accordance with the first polynomial and the second curved reflective surface of the mirror assembly in accordance with the second polynomial out of a block of metal. In one example, a third polynomial may be provided if the plurality of second coordinates are divided into adjacent sets of second coordinates.

In one example, the polynomials may be provide to a computer numerical control (CNC) machine. The CNC machine may carve the first reflective curved surface and the second reflective curved surface out of a block of metal in accordance with the polynomials. Once polished and metalized the mirror assembly carved by the CNC machine out of the block of metal may provide a uniform illumination on a target plane or area of build material on a platform of a 3D printer, as described above. At block 714, the method 700 ends.

Figure 8:
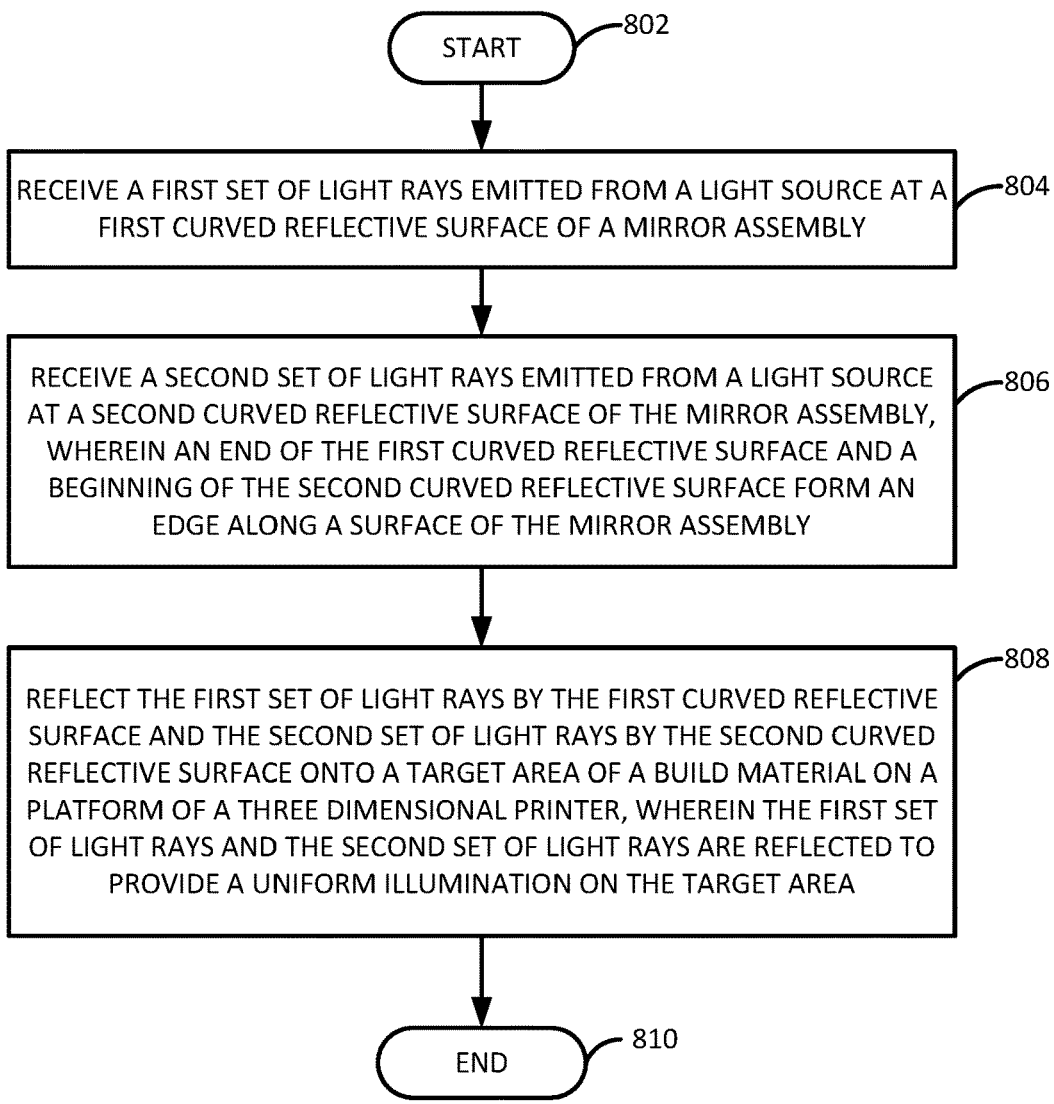
FIG. 8 is a flow chart of an example method to illuminate a target area of a 3D printer of the present disclosure.

FIG. 8 illustrates a flow diagram of an example method 800 to illuminate a target area of a 3D printer. In one example, the method 800 may be performed by the mirror assembly 102 of the 3D printer 100.

At block 802, the method 800 begins. At block 804, the method 800 receives a first set of light rays emitted from a light source at a first curved reflective surface of a mirror assembly. For example, the light source may be a light source having a cylindrical shape. Some of the light rays emitted by the light source may be directed towards the first curved reflective surface.

At block 806, the method 800 receives a second set of light rays emitted from a light source at a second curved reflective surface of the mirror assembly. For example, some of the light emitted by the light source may be directed towards the second curved reflective surface. The first curved reflective surface and the second curved reflective surface may be fabricated as described above in the method 700.

At block 808, the method 800 reflects the first set of light rays by the first curved reflective surface and the second set of light rays by the second curved reflective surface onto a target area of a build material on a platform of a three dimensional printer, wherein the first set of light rays and the second set of light rays are reflected to provide a uniform illumination on the target area. In one example, the size of the light source, the height of the mirror assembly, and the target area may determine a shape of the first curved reflective surface and the second curved reflective surface. As described above, these parameters may provide values for solving the functions described above. The shape of the first curved reflective surface and the second curved reflective surface may be determined based on the size of the light source, the height of the mirror assembly, and the target area. The first curved reflective surface and the second curved reflective surface may work together to provide a uniform illumination on the target area, as described above. At block 810, the method 800 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A mirror assembly, comprising:
a first side; and
a second side, wherein the first side is symmetrical to the second side and capable of enclosing a cylindrical light source, wherein the first side and the second side each comprise:
a first curved reflective surface, wherein the first curved reflective surface comprises a truncated circle involute; and
a second curved reflective surface, wherein an end of the first curved reflective surface and a beginning of the second curved reflective surface form an edge along a surface formed by the first curved reflective surface and the second curved reflective surface, wherein the second curved reflective surface is defined by at least two adjacent continuous segments, wherein each one of the at least two adjacent continuous segment is defined by a different polynomial having a fourth order or higher.

2. The mirror assembly of claim 1, wherein each point of the first curved reflective surface is formed by an end of a respective tangent ray from the cylindrical light source that is tangent to a circular cross-section of the cylindrical light source.

3. The mirror assembly of claim 1, wherein the first curved reflective surface of the first side and the second side and the second curved reflective surface of the first side and the second side reflect light emitted by the cylindrical light source to uniformly illuminate a target area of a platform of build material.

4. The mirror assembly of claim 1, wherein a shape of the first curved reflective surface and the second curved reflective surface is based on a chosen diameter of the cylindrical light source, a chosen target plane of a build material, and a height from a top of the build material to a bottom of the mirror assembly.

5. The mirror assembly of claim 1, wherein a width and a height of the mirror assembly are at least 8 times a radius of the cylindrical lamp.

6. A three dimensional (3D) printer, comprising:
- a platform;
- a build material dispenser to dispense a build material on the platform;
- a spreader to level the build material dispensed onto the platform;
- a light source comprising a mirror assembly to apply energy to build material on the platform, wherein the mirror assembly comprises symmetrical sides that enclose the light source, wherein each one of the symmetrical sides comprises:
  - a first curved reflective surface, wherein the first curved reflective surface comprises a truncated circle involute; and
  - a second curved reflective surface, wherein the second curved reflective surface is defined by at least two adjacent continuous segments, wherein each one of the at least two adjacent continuous segments is defined by a different polynomial having a fourth order or higher, wherein the first curved reflective surface and the second curved reflective surface are two different curved surfaces that are connected to form each side of the symmetrical sides; and
- a controller in communication with the build material dispenser, the platform, the spreader, and the light source to control operation of the build material dispenser, the platform, the spreader, and the light source.

7. The 3D printer of claim 6, wherein the mirror assembly is carved from a metal block.

8. The 3D printer of claim 6, wherein a distance between the platform and the mirror assembly is greater than a height of the spreader.

9. The 3D printer of claim 6, wherein the mirror assembly causes light rays emitted by the light source to be reflected onto a chosen target plane on the platform in a uniform illumination pattern.

* * * * *